(12) United States Patent
Hay

(10) Patent No.: US 7,056,255 B2
(45) Date of Patent: Jun. 6, 2006

(54) DIFFERENTIAL CAGE FOR A DIFFERENTIAL GEAR

(75) Inventor: Lothar Hay, Bad Sobernheim (DE)

(73) Assignee: Johann Hay GmbH & Co. KG (DE)

(*) Notice: Subject to any disclaimer, the term of this patent is extended or adjusted under 35 U.S.C. 154(b) by 89 days.

(21) Appl. No.: 10/736,583

(22) Filed: Dec. 17, 2003

(65) Prior Publication Data

US 2005/0137047 A1  Jun. 23, 2005

(51) Int. Cl.
*F16H 48/06* (2006.01)
*F16H 57/08* (2006.01)
*F16H 57/02* (2006.01)

(52) U.S. Cl. .................. 475/220; 475/331; 74/606 R
(58) Field of Classification Search ................ 475/220, 475/230, 331, 198, 225; 74/606 R, 607
See application file for complete search history.

(56) References Cited

U.S. PATENT DOCUMENTS

| | | | | |
|---|---|---|---|---|
| 3,517,572 A | * | 6/1970 | Schmid | 475/240 |
| 3,621,957 A | * | 11/1971 | Howe | 477/208 |
| 4,855,556 A | * | 8/1989 | Mucha et al. | 219/640 |
| 5,247,150 A | * | 9/1993 | Storm et al. | 219/640 |
| 5,396,968 A | * | 3/1995 | Hasebe et al. | 180/65.6 |
| 5,842,946 A | * | 12/1998 | Ichiki | 475/252 |
| 6,827,662 B1 | * | 12/2004 | Nishiji | 475/221 |
| 6,837,820 B1 | * | 1/2005 | Baxter | 475/220 |
| 6,916,268 B1 | * | 7/2005 | Ohkubo | 475/302 |

FOREIGN PATENT DOCUMENTS

| | | |
|---|---|---|
| JP | 62-132055 | 6/1987 |
| JP | 9-233784 | 9/1997 |

* cited by examiner

*Primary Examiner*—Roger Pang
(74) *Attorney, Agent, or Firm*—Schiff Hardin LLP (57) ABSTRACT

In a differential cage for a differential gear, a cage member is provided with a cavity machined on an inside and having an installation opening for compensating gears and driving gears. An axle drive gear and a parking lock gear form a one-piece forging together with the cage member.

14 Claims, 8 Drawing Sheets

DIFFERENTIAL CAGE FOR A DIFFERENTIAL GEAR

BACKGROUND

The instant preferred embodiment relates to a differential cage for a differential gear.

JP-A 62-132 055 discloses a differential cage member of cup shape formed at the bottom of the cup with a bearing projection to support an axle driving shaft. The open other end of the cup is surrounded by an axle drive gear forged together with the cup, and is closed by a cover which comprises a bearing projection aligned with the aforementioned bearing projection to support the other axle driving shaft and is screwed to the axle drive gear by way of a radial flange. Work on the interior of the cup can be performed from the open end thereof. The compensating gears and axle driving gears of the differential gear are introduced into the differential cage member through the open end of the cup and are mounted together with a pin on which the compensating gears are supported, whereupon the cover is fastened to the axle drive gear.

JP 09-233 784 discloses a differential cage comprising an axle driving gear which is forged in one piece with the differential cage member, the latter having axial bores of such size that the compensating gears and driving gears can be introduced into and mounted in the hollow interior thereof through one of the axial bores. Bearing sleeves are inserted in the axial bores, one bearing sleeve being press fitted at one end of the differential cage member and another different bearing sleeve being positioned and fixed at the opposite end by means of bendable clamping fingers.

Both known differential cages involve considerable installation expenditure. With the Japanese '055 patent the bores in the radial flange must be presented so precisely that the bearing projection of the cover determines a precise radial support for the axle-driving shaft to be introduced into the bearing projection. Furthermore, when screwing the cover to the flange, it must always be assured that the threading force will not strain or distort the cover so that, upon due alignment for installation, the bearing projection thereof will not become displaced from its radial and axial position for supporting the axle driving shaft. Moreover, precise finishing is required of the mounting surfaces of the flange and of the differential cage member to guarantee precise axial positioning support of the axle-driving shaft.

When press fitting the bearing sleeve in the differential cage according to the Japanese '784 patent the bearing projection of the bearing sleeve needs to be reworked to offer precise support for the axle driving shaft because torsional tensions and extension caused by the press fitting or shrinking procedures must be compensated. When using clamping fingers for attachment a great many installation steps are needed which is why this kind of attachment of the bearing sleeve is expensive and also because of the configuration of the clamping fingers on the bearing sleeve or the differential cage member. In addition, in the case of clamping, precise axial positioning can be obtained reliably only by readjusting or reworking the bearing projection.

SUMMARY

It is an object to provide a differential cage comprising a sleeve designed to support an axle drive shaft and inserted in an installation and/or machining opening of the differential cage in structurally simple and inexpensive manner, from the point of view of manufacturing technique, and requiring reduced assembly time for alignment and stationary positioning with respect to the differential cage member.

In a differential cage for a differential gear, a cage member is provided with a cavity machined on an inside and having an installation opening for compensating gears and driving gears. An axle drive gear and a parking lock gear form a one-piece forging together with the cage member.

DESCRIPTION OF THE PREFERRED EMBODIMENT

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

Differential cages comprising a cage member and an axle drive gear integrally connected to the same need to have an opening through which at least the hollow interior of the cage member can be finished. This opening likewise may serve for introducing compensating gears and driving gears into the inner cavity. In the differential cage according to the preferred embodiment one of the axial bores for supporting the driving shaft is used as an opening to carry out work. To accomplish that, this axial bore is made greater than the opposite bore which is designed in particular for direct supporting accommodation of the driving shaft. According to the preferred embodiment, a bearing sleeve is provided which, for precise axial and radial alignment, is threaded into the bore having the greater diameter and is securely and firmly held in the cage member by the establishment of a press fit. In this combined screwed and pressed connection, it is the threaded connection which mainly provides the axial fixation of the bearing sleeve, especially when the bearing sleeve is introduced and the press fit formed, whereas the press fit, on the one hand, secures the radial position of the bearing sleeve and, on the other hand, makes sure that the bearing sleeve remains firmly retained at the cage member even as extremely great axial and radial operating forces occur.

It should further be noted that the differential cage according to the preferred embodiment weighs much less than conventional differential cages which comprise screws, rivets, or clamping elements. Also, the differential cage according to the preferred embodiment offers the basis for quick production because no time consuming assembly steps are needed, such as tightening of screws, bending of clamping elements, or reworking such as by grinding or attaching by rivets. Finally, the differential cage according to the preferred embodiment allows the mounting of compensating gears and driving gears and closing of the cage member with the bearing sleeve to be accomplished automatically.

The combined screwed and pressed connection, preferably, is obtained, on the one hand, by an external thread formed on the bearing sleeve and an internal thread in the bore of greater diameter that are screwed together. On the other hand, the threaded portions of both bearing sleeve and bore each are contiguous to a smooth, axially extending surface. Upon installation, these surfaces become mutually engaged in press fitting relation.

In a further development of the preferred embodiment a groove is formed in the inside surface of the cavity to serve as a lubricant reservoir. The groove extends along the inside surface of the cavity, especially in a radial plane of the differential cage including in particular the axes of aligned bores of a bearing pin for compensating gears. surprisingly, it was found that due to the groove a sufficient lubricant film always forms between the compensating gears and driving gears and the inside surface of the cavity.

Accordingly, thrust washers of plastic material or sheet metal bushings can be dispensed with between the compensating gears and driving gears and the inside surface of the cavity. That in turn facilitates mounting of the compensating gears and driving gears in the differential cage.

In a preferred further modification of the preferred embodiment, the bore having the greater diameter is given such dimensions that it may serve as the installation opening for the compensating gears and driving gears. A differential cage which is particularly easy to make, especially to be forged, and of which the weight is very low can be obtained advantageously by no longer providing lateral installation openings. With this advantageous embodiment, a cavity is formed for the inner components of the differential gear and this cavity is totally closed once the bearing sleeve, the axle driving shafts, and the bearing pin for the compensating gears have been mounted. And, being a sealed lubricant space, it can be independent of lubricant supply from outside.

Moreover, as lateral installation openings are eliminated forging of the differential cage becomes easier because the differential cage blank need not be pre-slotted for the installation openings. Nor is it necessary to remove burr from lateral installation openings after machining, especially chip detaching of the forged differential cage blank.

An induction hardening process is to be applied in order to make sure that the toothing will be sufficiently hard while, at the same time, sufficient toughness is maintained in the core of the tooth. Such a process will be described in greater detail below.

The preferred embodiment also relates to a method of making a differential cage as defined in claim 7.

According to a preferred embodiment of the method of the invention, first of all, the area surrounding the axial bore is widened by heating so that the combined screwed and pressed connection may be obtained. At the same time, or subsequently, the bearing sleeve is threaded into the axial bore. Thereafter, the bearing sleeve which has been threaded into the axial bore is shrunk by cooling the area which surrounds the axial bore. Separate threaded and press fit surface areas each are provided for the combined screwed and pressed connection to be obtained.

With a preferred embodiment of the method according to the invention, the teeth of the axle drive gear are hardened inductively, especially by a dual frequency induction process. The teeth are heated inductively by means of an induction loop or coil which is placed around them and by supplying a high frequency voltage and a medium frequency voltage to the induction coil, either simultaneously or successively. If high temperature is desired only at the foot of the tooth a frequency mix of 10% high frequency and 90% medium frequency is applied. If, on the other hand, high temperature is needed only at the tip of the tooth a frequency mix of 90% high frequency and 10% medium frequency is used. Advantageously, as a hardened layer of uniform thickness near the surface is desired, the frequency mix should be adjusted within the limits mentioned above.

A frequency mix of 30% high frequency and 70% medium frequency may be indicated for optimum temperature distribution.

The preferred embodiment further relates to a differential cage for a differential gear to be used especially in an automatic transmission.

JP-A 09-229 162 discloses a differential cage of a differential gear comprising a cage member which is formed integrally with an axle drive gear. Here, the cage member has lateral openings through which a tool can be passed to machine the inside of the cavity and through which the compensating gears and driving gears can be inserted and mounted.

It is known especially with motor vehicles comprising an automatic transmission to provide a parking lock between a member which rotates with part of the drive of the vehicle and a member which is disposed on the chassis of the vehicle so that the vehicle may be kept at standstill when parked. The load acting on this parking lock is great, depending on the weight of the vehicle to be retained, especially when it is parked on a sloping street.

It is the technical problem of the preferred embodiment to devise a differential cage which can assume also the function of the rotating part of the parking lock without causing the weight and manufacturing expenditure to increase much.

The preferred embodiment suggests a differential cage of which the cage member, the axle drive gear, and the parking lock gear are devised as a one-piece forging. That permits the functions of the axle drive gear, the differential cage member, and the rotating part of the parking lock gear to be combined in a single structural member which is both compact and light and yet fulfills the separate requirements to be met by its constituent elements, namely a high fatigue limit and great wear resistance of the teeth of the axle drive gear and the parking lock gear, at a weight which is increased by no more than the gear ring of the parking lock gear.

In view of the fact that the parking lock gear and the differential cage form a unit, no separate fixation need be provided for the parking lock gear, such as on a rotary part connected to a vehicle wheel. The bearing support of the differential cage is designed to sustain high loading so that also the forces acting on the parking lock gear can be accommodated readily by the differential cage support, without the need for any modification of the support. It is another advantage of the forged differential cage according to the invention that its weight is reduced by at least 20% in comparison with the overall weight of a differential cage of similar design including an axle drive gear and a separate parking lock gear.

The compensating gears and driving gears are introduced through a lateral installation opening formed in the cage member into the cavity which has been machined on the inside and in which they find their support. A spherical bearing bushing of plastics may be provided between the inside surface of the cavity and the compensating gears and driving gears, in movable engagement with the inside surface.

The parking lock gear which is formed integrally with the differential cage partly covers the installation openings. To permit the compensating gears and driving gears to be passed into the differential cage past the parking lock gear in spite thereof, the parking lock gear is hollowed towards the cavity of the differential cage in the area of the installation opening, thereby presenting an installation opening which is big enough.

Easy assembly of the compensating gears and driving gears through the lateral installation opening into the cavity of the cage member and, in particular, easy machining of the inside surface of the cavity through the lateral installation opening is offered by another advantageous modification of the preferred embodiment according to which the differential cage comprises opposite, aligned bores adapted to receive a bearing pin for the compensating gears which bores are located at such a distance from the axle drive gear that a sufficiently great installation opening is provided which no longer is restricted by the parking lock gear and thus permits unobstructed introduction of the compensating gears and driving gears. In addition, a corresponding spacing of the bores for the bearing pin from the axle drive gear permits easy forging of the differential cage due to the fact that the cage member which is more difficult to forge, as it includes the spherical cavity, is further removed from the axle drive gear.

It is conventional to machine the cavity, which is to receive the compensating gears and driving gears, through the installation opening. This is done, for example, with the differential cage member according to JP-A 62 132 055 from the open end of the cup, and with the differential cage according to JP-A 09 229 162 it is done through the installation opening from the side so as to form internal supporting surfaces in the cage member for the compensating gears and also for the driving gears, as the case may be. Particularly in the second case, a one-piece differential cage without cover arrangement, work on the inside surface of the cavity requires that the differential cage be clamped sideways, i.e. on an axis perpendicular to the rotational axis of the differential cage. That results in imbalances which must be compensated by weights. The differential cage must be provided with separate recesses to be engaged by the machining tool in order for this kind of clamping to be carried out. Moreover, the lateral installation openings may not be big enough for machining of the inside surface of the cavity to be performed, or they may not have an adequate shape for the respective machining method to be applied.

To permit machining of the inside of the cavity in the differential cage, one of the aligned axial bores for supporting the axle driving shafts is given a diameter of such size that a machining tool can be passed through the axle driving shaft bore into the cavity of the differential cage for chip removal from the inside surface of the cavity. This embodiment of the differential cage is advantageous in that it makes it easier to clamp the differential cage for working on the inside and does not require any measures to compensate imbalances because the clamping axis coincides with the rotational axis of the differential cage. Moreover, rotationally symmetric recesses either are given anyway or easy to be provided.

This embodiment is advantageous when the dimensions of the lateral installation openings are restricted, such as is the case when an integrated parking lock gear exists.

A separate bearing sleeve for support of the axle driving shaft is provided in the enlarged bore which permits passage of the machining tool. This sleeve may be pressed or shrunk into the bore, or it may be welded to the forged differential cage. It is preferred to use heat treatable steel for the forging as that will convey sufficient hardness to the differential cage as well as a high fatigue limit and wear resistance.

The preferred embodiment further relates to a method of making a differential cage. The method of the preferred embodiment makes it possible for the axle drive gear, the differential cage member, and the parking lock gear to be combined in a single structural unit and be produced in a single working operation. In other words, a lot less steps are needed as compared to conventional methods of manufacturing differential cages with comparable functions.

The teeth of the axle drive gear as well as the parking lock gear must be hardened if they are to offer sufficient hardness and wear resistance. So far, the separately forged gears were casehardened. However, casehardening of the one-piece forging according to the invention would be time consuming and expensive and, besides, not suitable for the other sections of the differential cage which is to remain sufficiently tough and undistorted.

Expenditure and time can be reduced decisively by a particularly advantageous further development of the preferred embodiment according to which the teeth are induction hardened. An induction coil merely has to be placed around the respective toothing range of the gear concerned, then the area to be hardened may be heated briefly, e.g. for a few seconds by applying high frequency. Immediately thereafter, the member is quenched. In this manner, both great surface hardness of the teeth and sufficient toughness in the core of the tooth root are obtained. No reworking of the toothing is required after local induction heating. This means that the teeth may be shaved prior to being hardened, and that proves to be cheaper than grinding them after casehardening. During induction hardening, the structural member preferably is heated to a temperature of between 400 and 800° C., preferably 600° C. The heating may last less than 5 seconds, preferably from 0.5 to 1 second.

In a preferred induction hardening process the area to be hardened first is preheated for 3 to 4 seconds at medium frequency. Immediately afterwards, the structural member to be hardened is heated at high frequency for less than a second and then quenched at once. This shot hardening can provide the desired hardness properties of the teeth. Heat dissipation from the hot teeth into the cage member and any resulting distortion of the cage member can be prevented by recesses formed in the transitional zone between the teeth of the axle drive gear and the cage member, acting to resist thermal flux. Additionally, the weight of the differential cage becomes lower due to the recesses.

It should be noted that the differential cage including the parking lock gear also may be furnished with a bearing sleeve which is screwed in and pressed in. Moreover, the differential cage which includes the parking lock gear also may be designed to comprise the advantageous modifications offered by the screwed-in and pressed-in bearing sleeve.

FIGS. 1 to 6 illustrate a differential cage 1 of a differential gear comprising a radially extending axle drive gear 3, embodied here by a spur gear and having helical teeth 5 at its circumference. The broad area of the helical teeth 5 passes over by a narrow, rim-like transitional zone 7 into a parking lock gear 11 disposed adjacent the axle drive gear 3 with which it is coaxial.

At its circumference the parking lock gear 11 is formed like a spur gear 13 to be engaged by a parking lock pawl (not shown) in order to prevent a vehicle from rolling along. A cage member 15 (see FIGS. 2 and 5) is connected integrally with the parking lock gear 11. At its end remote from the parking lock gear 11, the cage member 15 comprises a hollow pin 21 to support an axle driving shaft (not shown). All the parts mentioned above of the differential cage 1 are forged from a blank of heat-treatable steel. The parking lock gear 11 is calibrated after forging when cold in the event that greater dimensional inaccuracies should become evident on the parking lock gear 11 after forging. Furthermore, the differential cage 1 is machined wherever necessary. When mounted, the differential cage 1 is received in a bearing assembly (not shown) so as to be rotatable about the rotational axis Z.

Aligned bores 23 having a common axis A are provided in the transitional zone from the parking lock gear 11 to the cage member 15 to receive a bearing pin (not shown) for compensating gears (not shown). Adjacent one bore 23 there is a hole 25 through which a locking pin (not shown) is inserted to secure the bearing pin.

The cage member 15 and the parking lock gear 11 define a substantially spherical cavity 31 into which the compensating gears and driving gears are to be introduced sideways through an installation opening 33 into the differential cage, i.e. in a mounting direction M (see FIGS. 4 and 6) perpendicular to the rotational axis Z. For ease of introduction of the compensating gears and driving gears the parking lock gear 11 is formed with a recess 35 which presents part of the installation opening 33. The spacing a of the axis A from that side 3a of the axle drive gear 3 which faces the parking lock gear 11 is selected so that a sufficiently great lateral installation opening 33 will be available for mounting the compensating gears and the driving gears.

Figure 1:
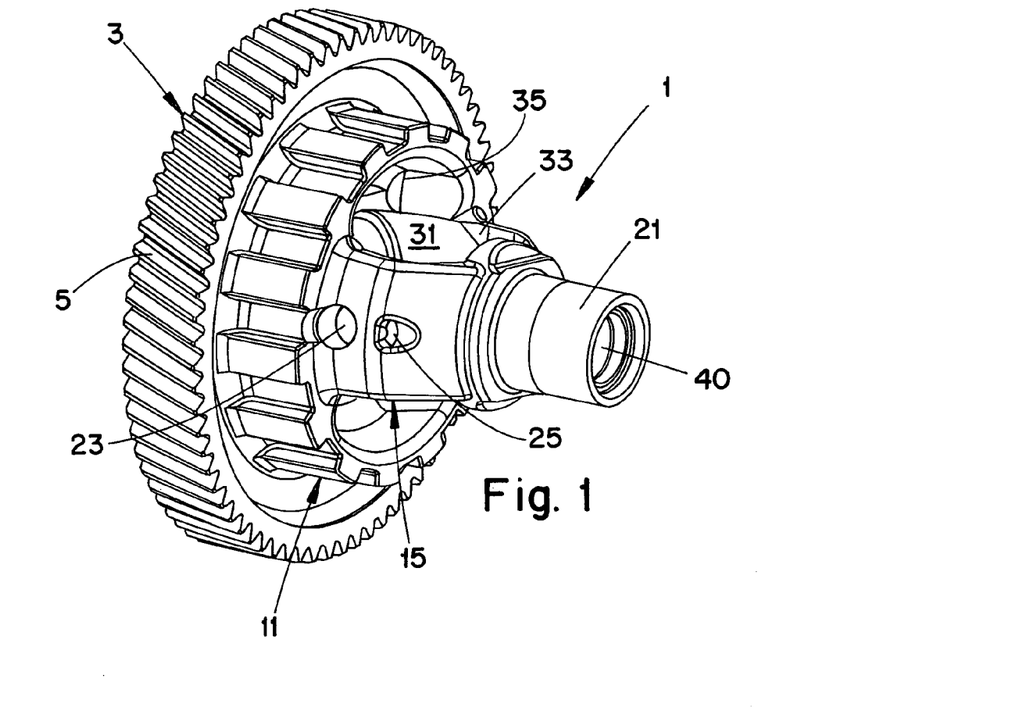
FIG. 1 is a perspective view of a differential cage according to the preferred embodiment.
Figure 2:
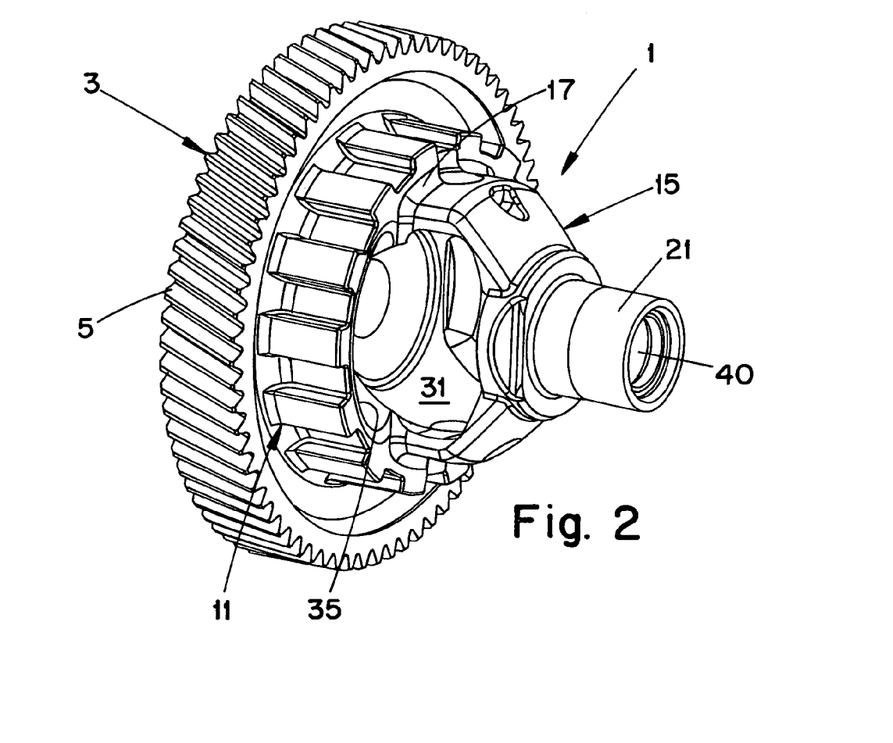
FIG. 2 is a perspective view of the differential cage shown in FIG. 1, rotated through 90° around the rotational axis Z.
Figure 3:
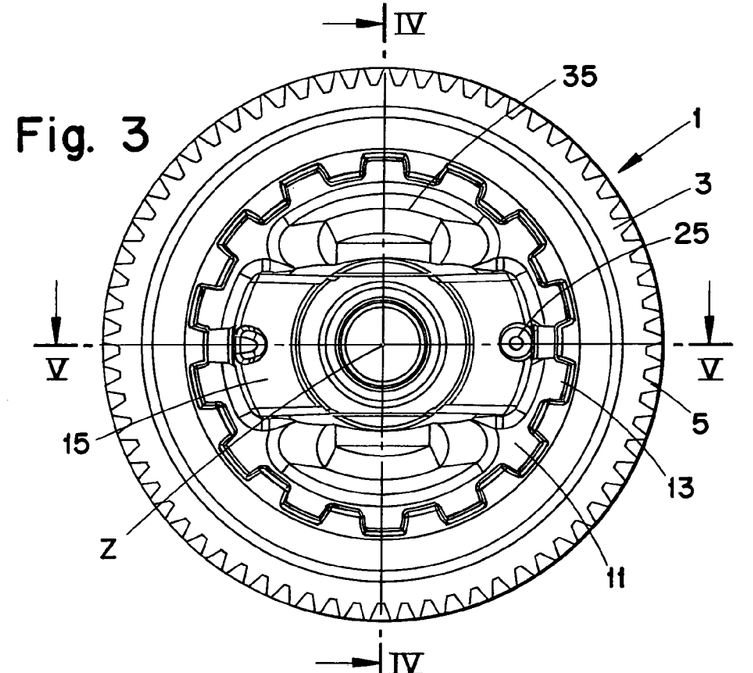
FIG. 3 is a top plan view of the differential cage shown in FIGS. 1 and 2.
Figure 4:
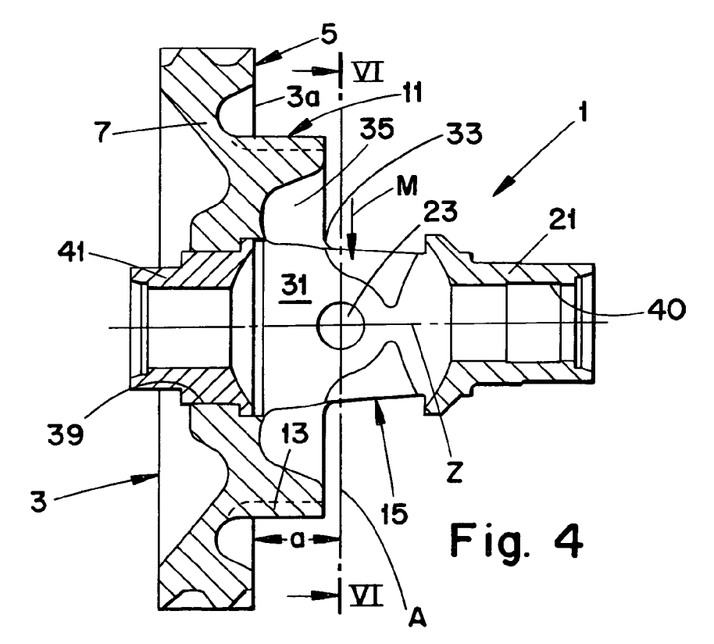
FIG. 4 is a cross sectional elevation of the differential cage along line IV—IV in FIG. 3.
Figure 5:
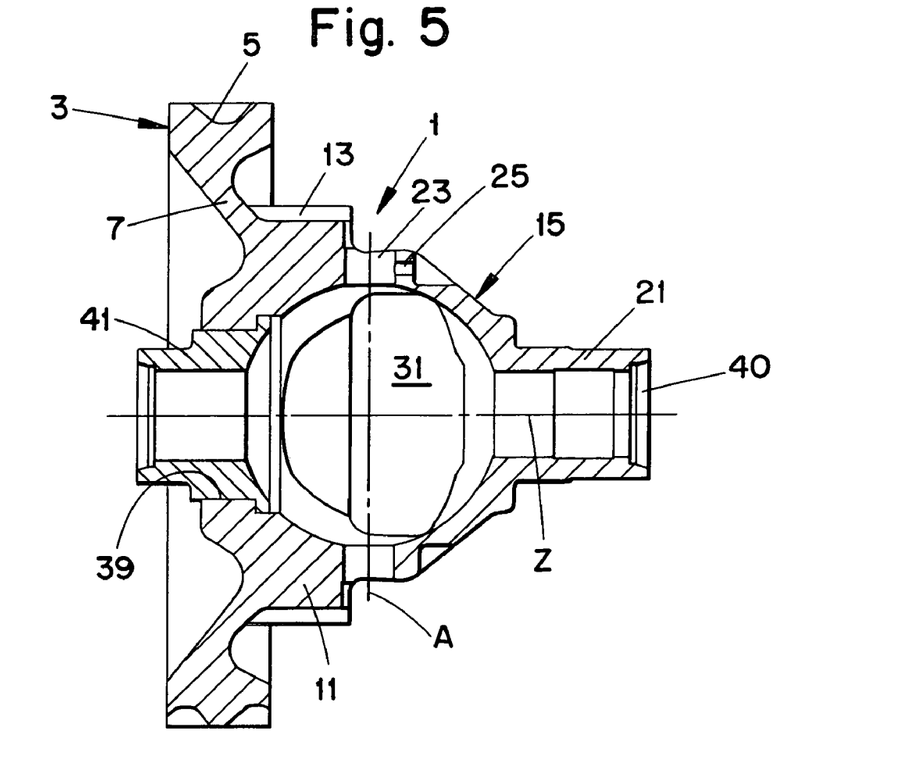
FIG. 5 is a cross sectional elevation of the differential cage along line V—V in FIG. 3.
Figure 6:
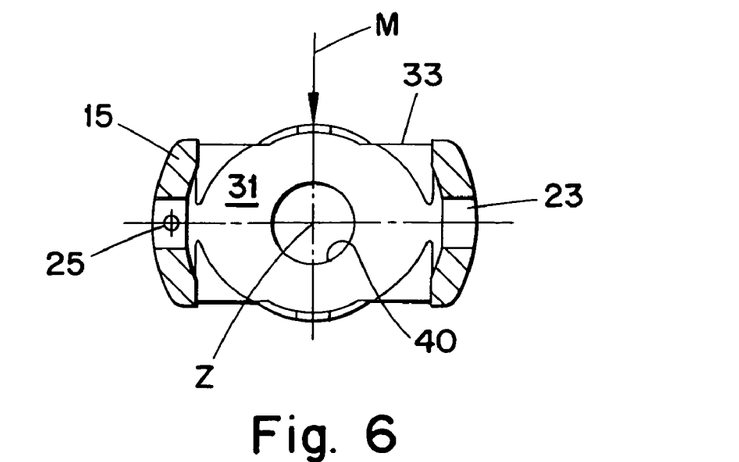
FIG. 6 is a cross sectional elevation of the differential cage along line VI—VI in FIG. 4.

The differential cage 1 has two bores 39, 40 which are coaxial with the rotational axis Z and serve to support axle driving shafts (not shown). The diameter of the bore 39 which is surrounded by the axle drive gear is great enough for a machining tool (not shown) to be passed through the bore into the cavity 31 and be positioned at adequate angles for machining the inside surface of the cavity 31. Support of the axle driving shaft is offered by a bearing sleeve 41 which is pressed into the bore 39 (FIGS. 4 and 5). The bearing sleeve 41 also might be welded to the surrounding region of the axle drive gear 3.

Figure 7:
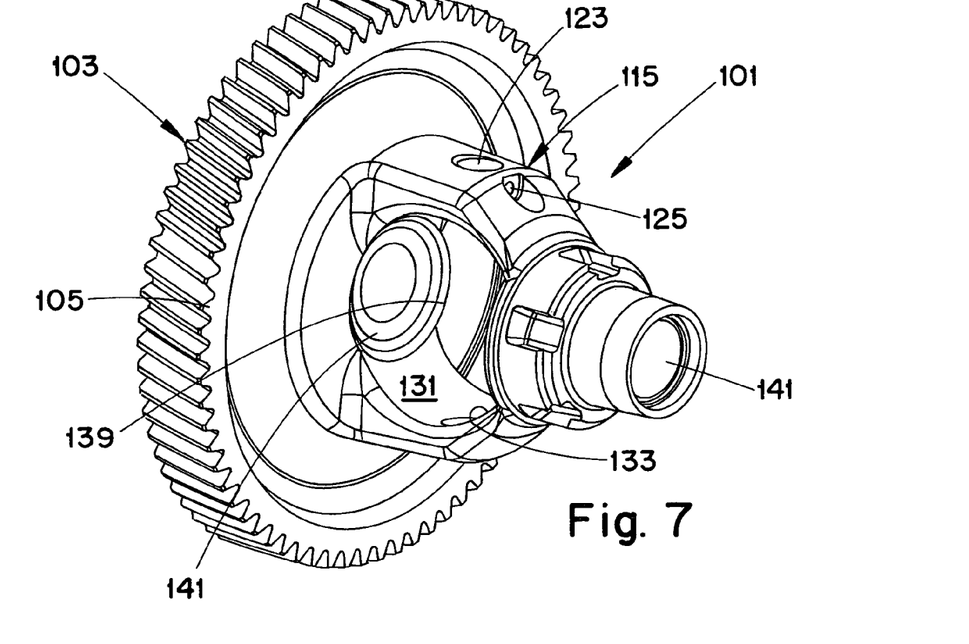
FIG. 7 is a perspective view of another differential cage according to the invention without parking lock gear.
Figure 8:
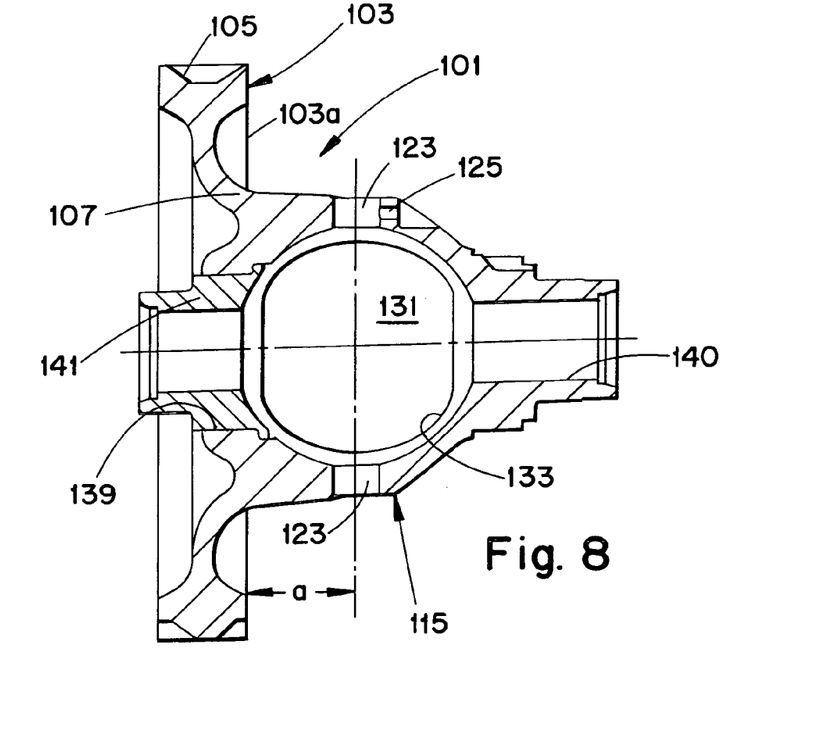
FIG. 8 is a cross sectional elevation similar to FIG. 5 of the differential cage shown in FIG. 7.

FIGS. 7 and 8 illustrate a differential cage 101 in another embodiment according to the invention, without parking lock gear. The same reference numerals as before, each increased by 100, are used for identical or similar elements. The differential cage 101, again a one-piece forging, comprises an axle drive gear 103 and a cage member 115 contiguous with the transitional zone 107. In the cage member 115, lateral installation openings 133 are provided through which compensating gears and driving gears (not shown) can be introduced into the cavity 131. The diameter of a bore 139 surrounded by the axle drive gear 103 and serving to support an axle driving shaft (not shown) is selected to be great enough for machining the inside surface of the cavity 131. A bearing sleeve 141 is pressed into this bore 139. The inner diameter of the bearing sleeve 141 for supporting the axle driving shaft is of the same size as that of the bore 140 of the bearing pin for the other axle driving shaft.

Figure 9A:
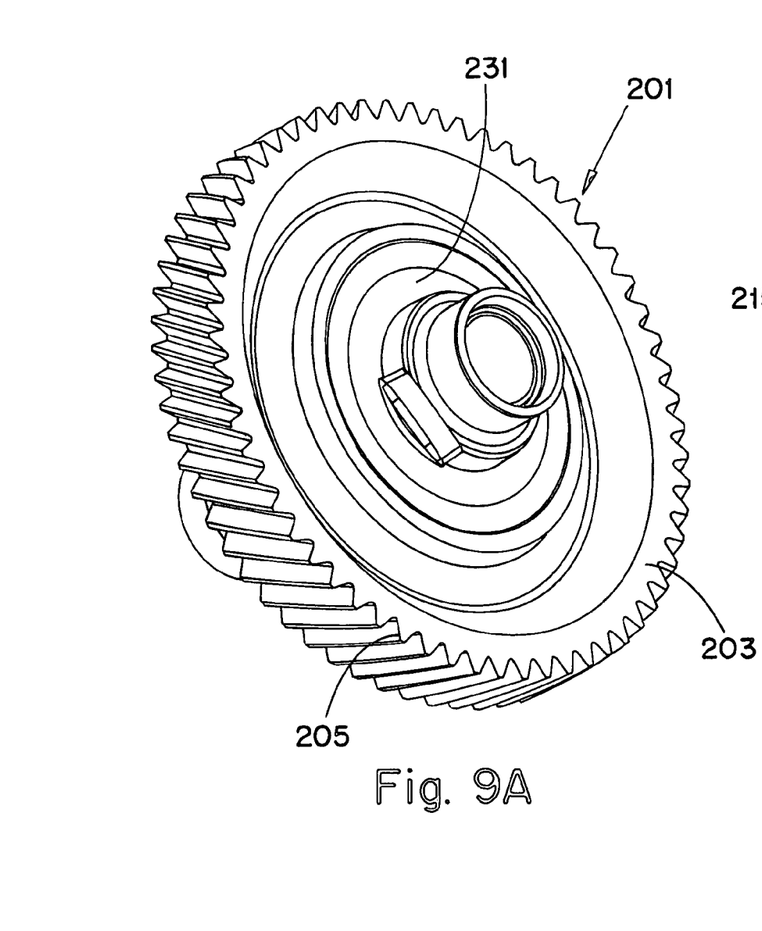
FIGS. 9A, 9B are perspective views of another differential cage according to the invention without parking lock gear.
Figure 9B:
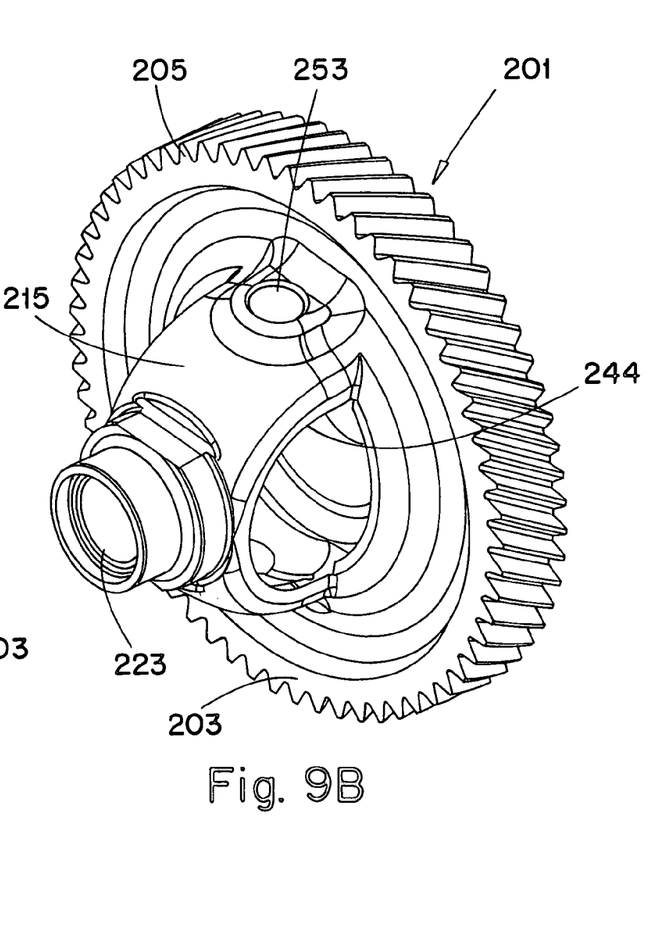

The differential cage 201 illustrated in FIGS. 9A and 9B of a differential gear comprises a radially extending axle drive gear 203 in the form of a spur gear. The axle drive gear 203 comprises helical teeth 205 at its circumference. As best to be seen in FIGS. 10 and 11, the broad area of the helical teeth 205 passes over by a narrow, rim-like transitional zone 207 into a cage member 215. The axle drive gear 203, the transitional zone 207, and the cage member 215 are implemented as a one-piece forging.

Figure 10:
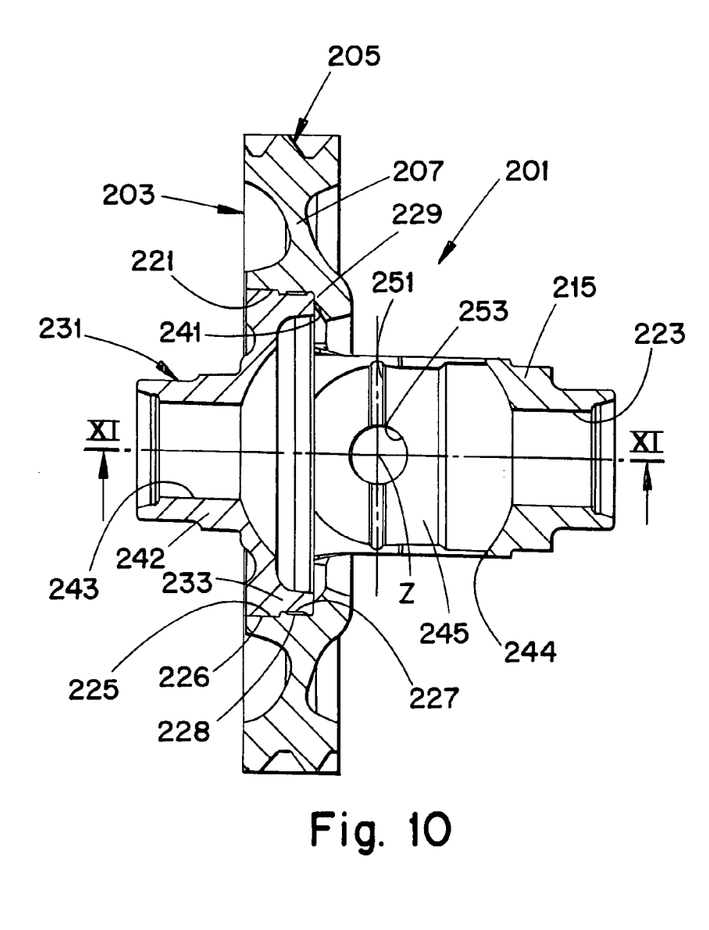
FIG. 10 is a cross sectional elevation of the differential cage shown in FIGS. 9A and 9B.
Figure 11:
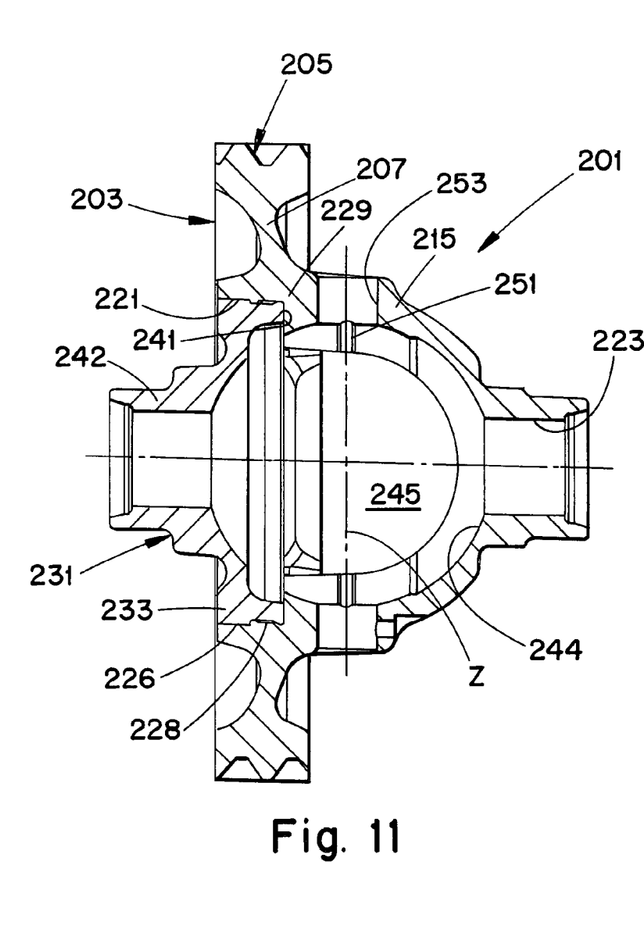
FIG. 11 is a sectional elevation of the differential cage shown in FIGS. 9A and 9B along line XI—XI in FIG. 10.
Figure 12A:
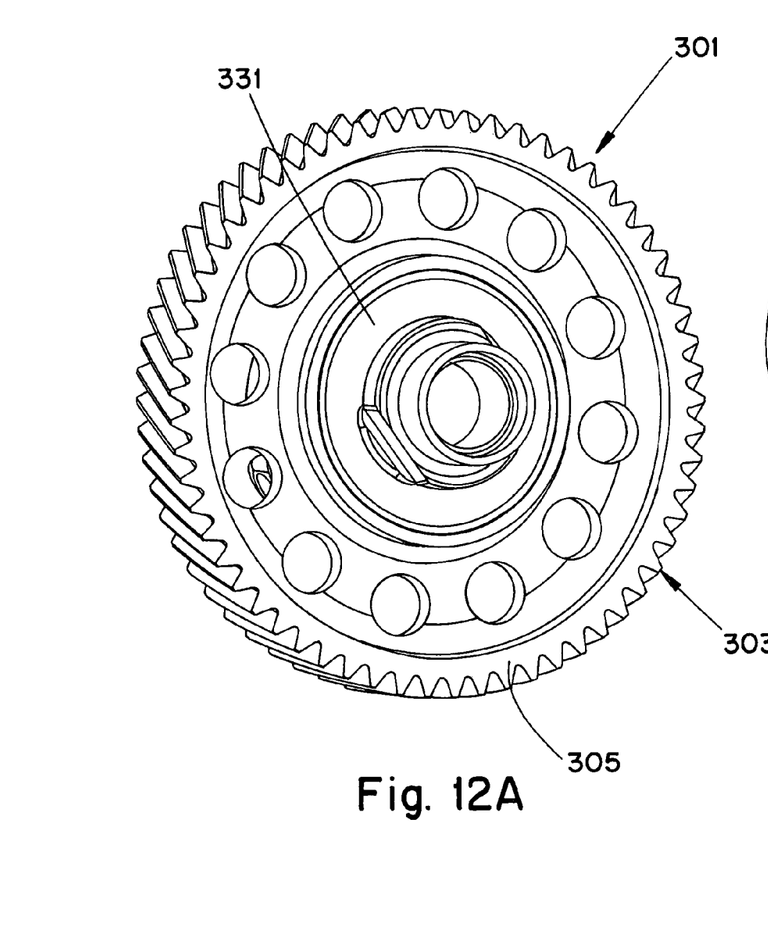
FIGS. 12A, 12B are perspective views of another differential cage according to the invention without parking lock gear.
Figure 12B:
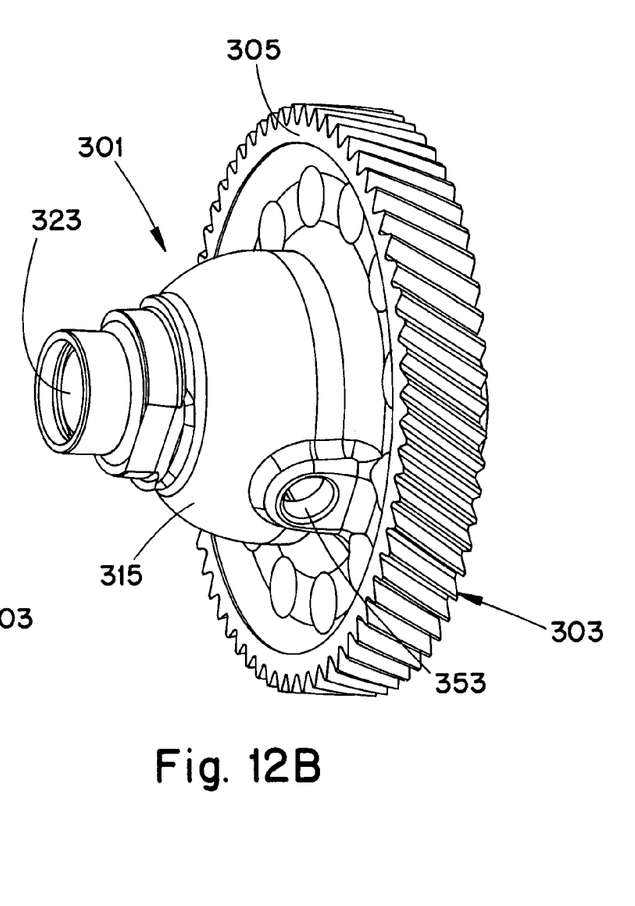

The cage member 215 comprises axial bores 221, 223. The axial bore 221 at the axle driving end has a greater diameter than the axial bore 223 which is distal to the axle drive gear 203. The inner surface of the axial bore 223 is designed specifically for supporting an axle driving shaft (not shown).

The axial bore 221 of greater diameter offers a first cylindrical surface area 225 and next to it an internal thread 227 cut into the axial bore 221. The area destined for the internal thread 227 in the axial bore 221 has a diameter which is smaller than that of the cylindrical surface area 225 by approximately the depth of the thread. A step 229 directed radially inwardly is formed adjacent the thread 227 to act as an axial abutment.

A bearing sleeve 231 is seated in the bore 221 so as to establish a combined screwed and pressed connection with the cage member 215. To this end, the bearing sleeve 231 comprises a wide collar 233 which is sunk practically completely into the axial bore 221 when mounted. At its collar 233 the bearing sleeve 231 has a second surface area 226 of which the diameter is slightly greater than that at the first surface area 225 in the axial bore 221, the second surface area cooperating functionally in press fit with the first surface area 225 of the axial bore 221. The second surface area of the bearing sleeve is followed directly by an external thread 228 which is screwed into the internal thread when the bearing sleeve 231 is mounted. The ultimate axial mounting position of the bearing sleeve 231 is reached when its front end surface 241 facing the bore abuts against the step 229.

The bearing sleeve 231 has a bearing projection 242 formed with an internal bore 243 designed to support an axle driving shaft (not shown).

In a radial plane of the differential cage, a groove 251 is cut in the inside surface of the cavity 245 in the cage member 215 so as to be continuous around the cavity, except in places of lateral openings 244 and bores 253 for receiving a pin for the compensating gears (both not shown). Lubricant accumulates in this groove during operation of the differential gear. It was found that thrust washers or bushings no longer are required to avoid considerable effects of friction between the inside surface of the cavity 245 and the compensating gears and driving gears (not shown) because an adequate lubricant film forms between the inside surface of the cavity 245 and the compensating gears and driving gears (not shown), starting from the groove 251 which serves as a reservoir of lubricant that is present in the surroundings of the differential cage.

The groove 251 is positioned in the radial plane in which also lies the common axis Z of the bores 253 for the bearing pin of the compensating gears. The Z axis is located at a distance from the axle drive gear 203, great enough for the bearing pin to be introduced easily into the bores 253, past the axle drive gear 203.

FIGS. 12A, 12B, 13, and 14 illustrate a preferred embodiment of the differential cage which is similar to the embodiment shown in FIGS. 9A, 9B, 10, and 11, and like or similar elements are designated by the same reference numerals, increased by 100. The differential cage 301 shown in FIGS. 12A, 12B, 13, and 14 differs from the differential cage 201 according to FIGS. 9A, 9B, 10, and 11 in that there are no lateral installation openings (244 in the embodiment shown in FIGS. 9A, 9B, 10, and 11) in the cage member 315.

Figure 13:
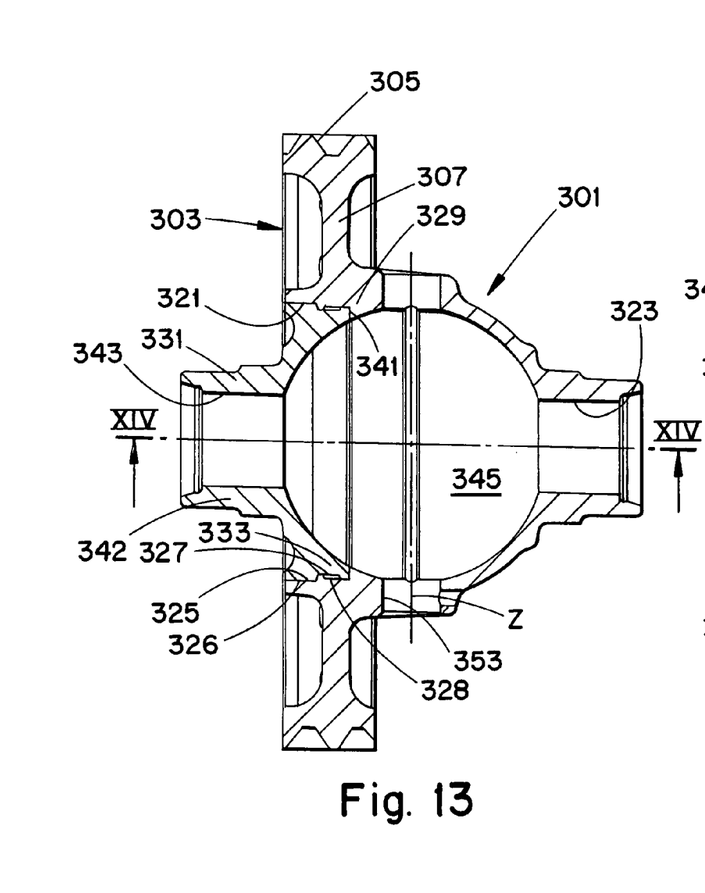
FIG. 13 is a cross sectional elevation of the differential cage shown in FIGS. 12A and 12B.
Figure 14:
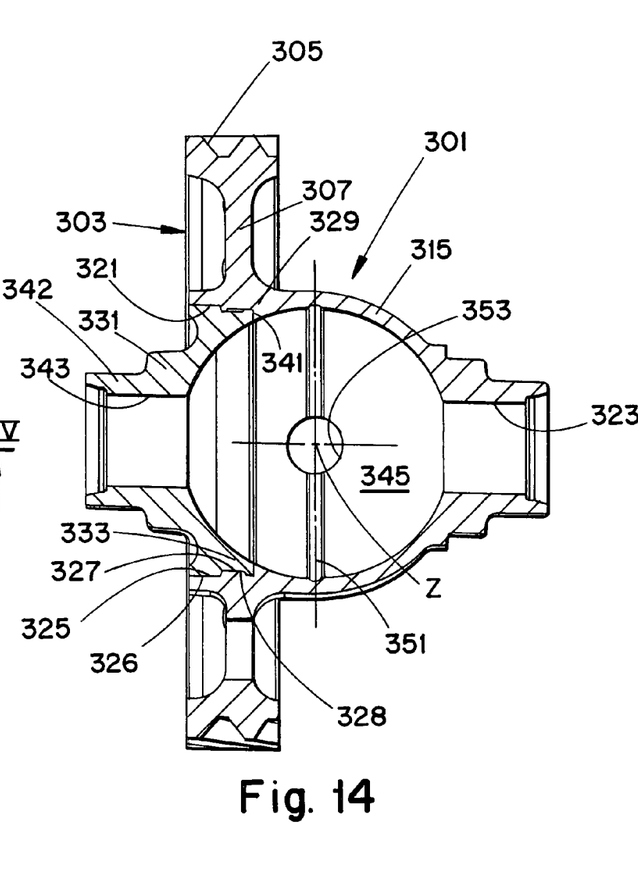
FIG. 14 is a sectional elevation of the differential cage shown in FIGS. 12A and 12B along line XIV—XIV in FIG. 13.

When the bearing sleeve 313 as well as the axle driving shafts (not shown) and the bearing pin (not shown) for the compensating gears (not shown) all have been installed, a closed cavity 345 is obtained in the interior, able to create a lubricant atmosphere which is separated from the surroundings of the differential gear and thus adapted to the specific frictional conditions of the members inside it of the differential gear. Furthermore, the groove 351 provided in the inside surface of the cavity 345 may be longer since openings (244) are missing.

The closed configuration of the differential cage is advantageous for manufacturing reasons as no cut is required for openings (244) in the cage blank prior to the forging operation on a blank made of heat treatable steel. Moreover, the closed design of the differential cage 301 permits the wall thickness of the cage member 315 to be reduced, resulting in considerably lower weight of the cage member.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

What is claimed is:

1. A differential cage for a differential gear, comprising:
a cage member with a cavity machined on an inside and having an installation opening for compensating gears and driving gears;
an axel drive gear and a parking lock gear which form a one-piece forging together with the cage member; and
said parking lock gear being disposed at a side of the axle drive gear facing the cage member and adjacent the same, the cage member being formed with said installation opening being lateral, part of said lateral opening extending into the parking lock gear for introducing said compensating gears and driving gears into the cavity.

2. A differential cage of claim 1 including aligned bores having a common axis to accommodate a bearing pin for the compensating gears, a spacing of the common axis from the axle drive gear being chosen dependent on a desired size of said installation opening.

3. A differential cage of claim 1 wherein said cage member has two bores to support respective axle driving shafts, and wherein one of said two bores has a diameter which is great enough for a machining tool to be entered into said cavity, and a separate bearing sleeve for the associated axle driving shaft being received in said bore with said great enough diameter.

4. A differential cage of claim 1 wherein teeth of said axle drive gear are induction hardened.

5. A differential cage of claim 1 wherein teeth of said parking lock gear are induction hardened.

6. A differential cage of claim 1 wherein said cage member has two bores to support respective axle driving shafts, and wherein one of the bores is larger than the other bore and a bearing sleeve is mounted in the larger bore for supporting the respective axle driving shaft.

7. A differential cage of claim 1 wherein teeth of the axle drive gear and parking lock gear are induction hardened by a dual frequency induction process.

8. A differential cage of claim 1 wherein said cage member has two bores to support respective axle driving shafts.

9. A differential cage for a differential gear, comprising:
a cage member with a cavity machined on an inside and having an installation opening for compensating gears and driving gears;
an axel drive gear and a parking lock gear which form a one-piece forging together with the cage member;
said cage member having two bores to support respective axle driving shafts;
one of the bores being larger than the other bore and a bearing sleeve being mounted in the larger bore for supporting the respective axle driving shaft; and
the bearing sleeve being press fit in the larger bore.

10. A method of making a differential cage for a differential gear, said differential cage comprising a cage member having a cavity machined on an inside surface, an installation opening for introduction, accommodation, and support of compensating gears and driving gears, two bores to support respective driving shafts, one of the bores having a diameter greater than the other bore, and an axle drive gear and a parking lock gear, comprising the steps of:
forging the cage member, the axle drive gear, and the parking lock gear from a single part; and
press fitting a bearing sleeve into said bore with the greater diameter.

11. A method of claim 10 wherein teeth of the axle drive shaft and parking lock gear are induction hardened.

12. A method of claim 10 wherein the differential cage has two bores to support respective axle driving shafts.

13. A method of claim 12 wherein a diameter of one of said bores is made greater than the other one, and said inside surface of the cavity is machined through the bore with the greater diameter, and a separate bearing sleeve for support of the respective axle driving shaft is inserted into the bore with the greater diameter.

14. A method of claim 10 wherein teeth of the axle drive shaft and/or teeth of the parking lock gear are induction hardened in a dual frequency induction process, the respective teeth being subjected to a high frequency and a medium frequency simultaneously in a dual frequency induction process, a frequency mix of the high frequency and the medium frequency being adjusted so that layers near a surface are heated substantially equally from a root of the tooth to a tip of the tooth.

* * * * *